United States Patent [19]

Leader et al.

[11] Patent Number: 5,470,363
[45] Date of Patent: Nov. 28, 1995

[54] AIR BLOWER AND FILTER ASSEMBLIES

[75] Inventors: William J. Leader; Dennis K. Smith, both of Albuquerque, N.M.

[73] Assignee: Envirco Corporation, Albuquerque, N.M.

[21] Appl. No.: 373,941

[22] Filed: Jan. 13, 1995

[51] Int. Cl.$^6$ .................................................. B01D 46/10
[52] U.S. Cl. .......................... 55/276; 55/385.2; 55/438
[58] Field of Search .................................. 55/276, 385.2, 55/462, 438

[56] References Cited

U.S. PATENT DOCUMENTS

| | | | |
|---|---|---|---|
| 2,591,408 | 4/1952 | Crankshaw | 55/438 |
| 2,704,504 | 2/1950 | Wilkening . | |
| 3,672,773 | 6/1972 | Moller | 55/276 |
| 4,560,395 | 12/1985 | Davis . | |
| 4,568,243 | 2/1986 | Schubert et al. . | |
| 4,790,863 | 12/1988 | Nobiraki et al. . | |
| 4,838,910 | 6/1989 | Stollenwerk et al. | 55/385.2 |
| 4,898,087 | 2/1990 | Fitzner et al. . | |
| 4,970,753 | 11/1990 | Herron, Jr. | 55/276 |
| 5,085,057 | 2/1992 | Thompson et al. . | |

*Primary Examiner*—Tim R. Miles
*Attorney, Agent, or Firm*—Dowell & Dowell

[57] ABSTRACT

Compact blower and filter assemblies for providing clean air to work place and other enclosed environments wherein the blower cooperates with an intermediate baffle to direct incoming air radially outwardly toward opposite endwalls of the assembly housing after which the air flows downwardly across and through a filter element which closes the discharge end of the housing. The intermediate baffle is generally rectangular in configuration having four corners adjacent which are disposed angled deflectors which direct air inwardly with respect to the corners of the housing as the air passes toward the filter and which incorporates a plate which reflects blower noise.

23 Claims, 3 Drawing Sheets

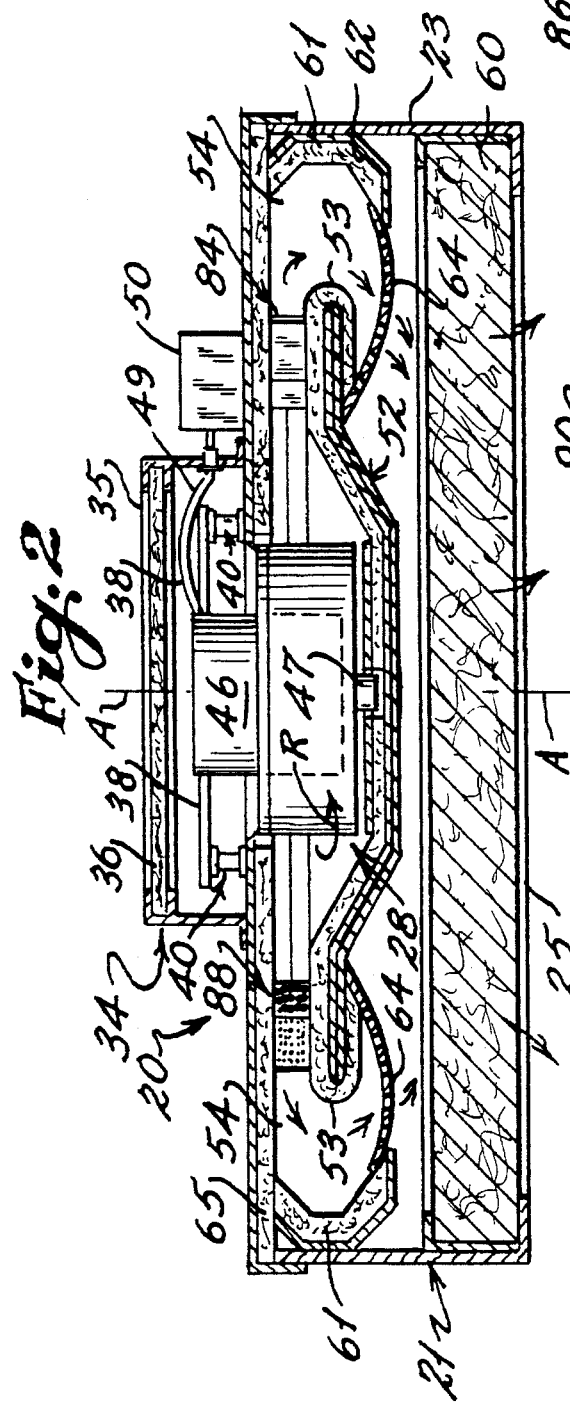
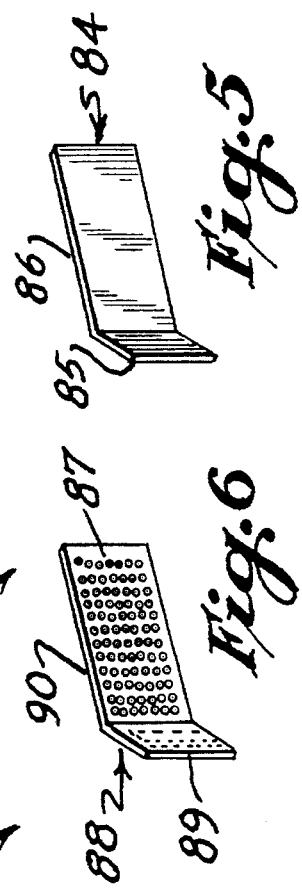
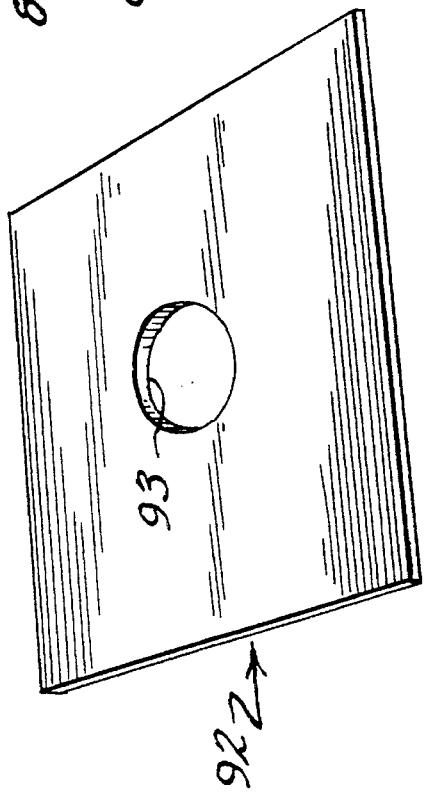
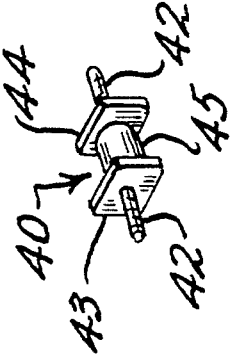

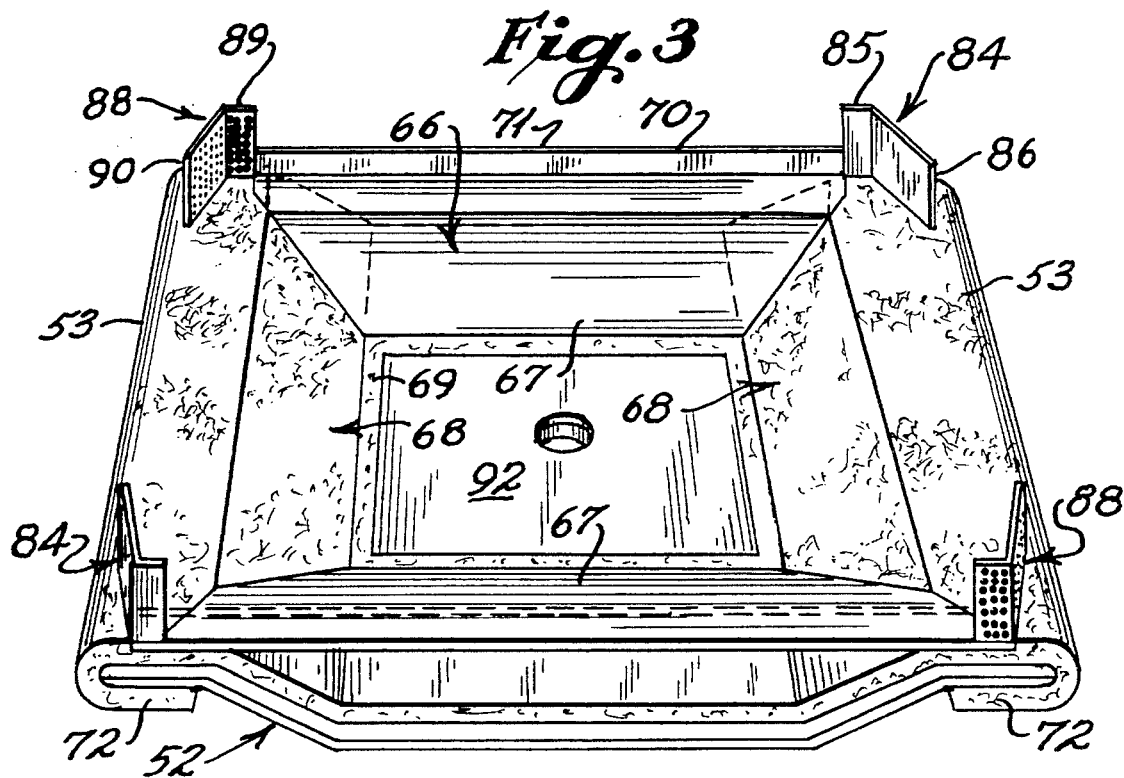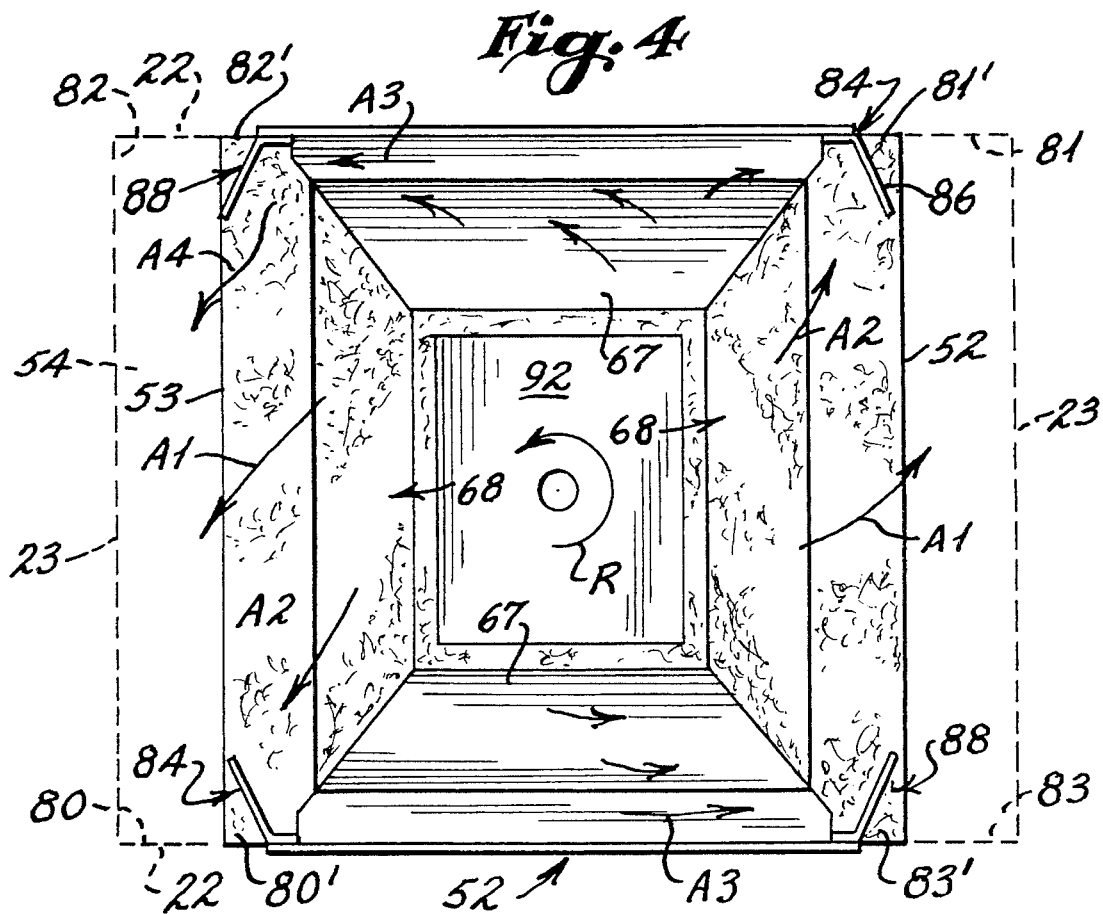

AIR BLOWER AND FILTER ASSEMBLIES

BACKGROUND OF THE INVENTION

1. Field of the Invention

This invention is generally directed to compact blower and filter assemblies for introducing a filtered air flow to enclosed environments wherein the blower and filter are mounted within a rectangular housing in close proximity to one another and are separated by an intermediate baffle. More particularly, the invention is directed to improvements which reduce the noise and vibration level and improve air uniformity associated with the air passing through such blower and filter assemblies by the use of deflectors associated with the intermediate baffle and walls of the housing which deflectors direct the flow of air moving radially outwardly relative to the blower away from the corners of the housing as the air passes around the intermediate baffle and toward the filter.

2. History of the Related Art

U.S. Pat. No. 4,560,395 to Davis discloses a compact blower and filter assemblies which are used to purify air in an enclosed environment. The air filter units may be ceiling mounted or mounted to the upper portion of work stations or work cabinets. Each unit includes a generally rectangular housing in which an internal blower directs incoming air outwardly toward the ends of the housing. An internal baffle assists in directing the air toward the end of the housing after which the air is directed toward a discharge from the housing through a filter.

Although this type of blower and filter assembly operates comparably quieter and with less vibration than previous blower and filters utilized to purify air in enclosed environments, there remain operative characteristics of such assemblies which do create undesirable noise and vibration.

It has been observed through various tests, that various motor imbalances lead to vibration of the housing of such filter assemblies. Further, the blowers when rotating actually function to generate noise as they direct sound waves toward the internal baffle. Further, because of the rectangular configuration of such assemblies, air is directed along the interior sidewalls into the corners of the housing where a great deal of turbulence is created.

SUMMARY OF THE INVENTION

The present invention has been made in view of the above-described deficiencies of the related prior art and has as one of its primary objects to provide a compact blower and filter assembly which operates with less noise and vibration than previously possible.

The present invention is directed to a filtration unit which includes a rectangular housing having upper and lower portions, opposing sidewalls, and opposing endwalls. The housing defines an interior plenum chamber in which a blower is mounted so as to draw air through an inlet in the upper portion of the housing. An intermediate or first baffle is mounted within the housing so as to assist the blower in directing air radially within the plenum chamber toward the endwalls of the housing. In the preferred embodiment, the blower is mounted on isolators which include soft rubber like components for damping any vibration between the motor brackets which suspend the motor and the upper portion of the housing. A filter is provided below the first baffle so that all air passing around the ends of the first baffle passes therethrough before passing through a discharge outlet in the bottom portion of the housing.

In the preferred embodiment, the first baffle includes a depressed central portion and upwardly and outwardly extending endwalls and upwardly and outwardly extending sidewalls. A sound reflecting plate is placed below the blower within the recessed area so as to re-direct sound directed toward the baffle from the blower.

In order to prevent turbulent airflow, reduce locally excessive pressures and to reduce operating noise characteristics of the unit, deflector plates are mounted in spaced relation from each of the corners of the housing and between the first baffle and the upper portion of the housing. Again, in the preferred embodiment, a first pair of deflectors are mounted adjacent to but spaced from a first pair of diagonal corners of the housing so as to direct air flowing toward the corners inwardly toward the endwalls from which the air is re-directed toward the filter. These first deflectors are generally imperforate.

The first corners are those in which a greater pressure is created due to a greater portion of the airflow moving more radially with respect to the corners by the blower and first baffle. The pressure developed in the opposite diagonal corners is less probably due to some of the air being directed by the sidewalls of the housing toward the corners where such directed air mixes with air moving radially toward such corners.

A second pair of perforated deflectors are mounted within the housing adjacent to but spaced from the opposite diagonal corners thereof. These second deflectors also extend between the first baffle and the upper portion of the housing. These deflectors not only direct portions of radially moving air as well as the airflow along the adjacent sidewall of the housing toward the adjacent endwall and away from the corners, but also allow some air to flow through the openings provided therein. The orientation and length of the first and second pairs of deflectors may vary, however, each deflector has a portion which is angled toward the adjacent endwall of the housing.

It is therefore another object of the present invention to provide a compact blower and filter assembly which incorporates a plate for reflecting noise back toward the blower and which is positioned generally in axial alignment with respect to the blower within the housing of the air filtration apparatus.

It is a further object of the present invention to further reduce noise and vibration of a compact air blower and filter assembly by suspending the motor from vibration damping isolators which are provided between the motor mounting brackets which support the motor and the unit housing.

It is yet another object of the present invention to reduce the noise level and vibration of compact air blower and filter assemblies by providing deflector plates for preventing air turbulence and locally excessive pressures from being developed in the corners of the housings of such assemblies.

BRIEF DESCRIPTION OF THE DRAWINGS

FIG. 2 is an enlarged cross-section of view taken along 2—2 of FIG. 1.

FIG. 3 is a top perspective view of a first air baffle positioned between the blower and filter of the invention as shown in FIG. 2

FIG. 4 is a top plan view of the first baffle with the surrounding housing shown in dotted line incorporating arrows showing the movement of air utilizing the improvements of the present invention relative to the first baffle and housing.

FIG. 5 is a perspective view of a first air deflector plate of the present invention.

FIG. 6 is a perspective view of a second perforated deflector plate of the present invention.

FIG. 7 is a perspective view of a motor isolator utilized to support the motor to the housing of the present invention.

FIG. 8 is a perspective view of a sound reflecting plate utilized with the first baffle of the present invention.

DESCRIPTION OF THE PREFERRED EMBODIMENT

Figure 1:
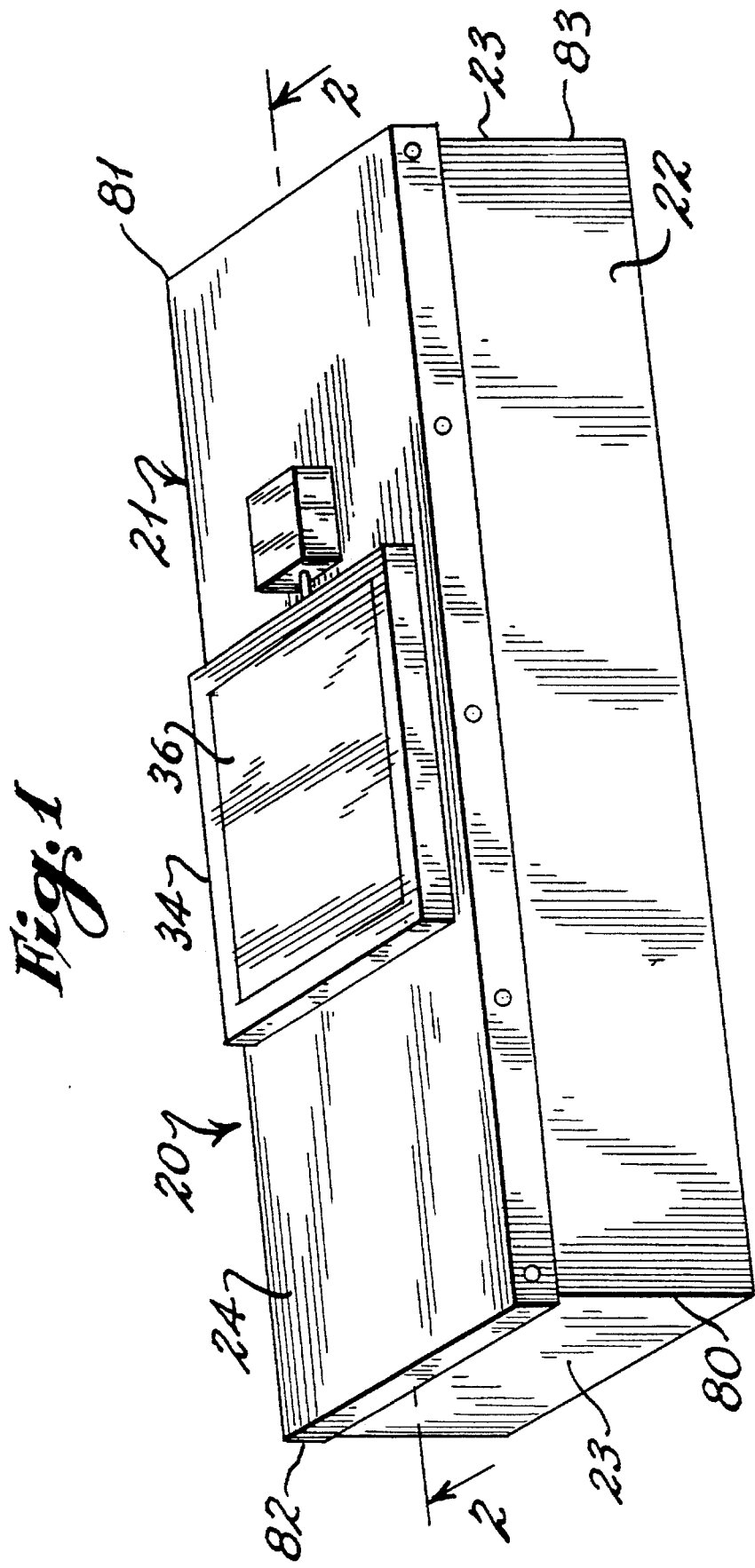
FIG. 1 is a top perspective view of an air blower and filter assembly of the type incorporating the improvements of the present invention.

The present invention is directed to compact high efficiency air filtration units of the type which are normally constructed to be suspended or installed from a ceiling in an enclosed area or from the upper portion of an enclosed or semi-enclosed work station. A preferred structure for such air filtration units is disclosed in U.S. Pat. No. 4,560,395 to Davis, the contents of which are incorporated herein by reference.

With continued reference to the drawing figures, the improvements of the present invention are utilized with a combination air blower and filter assembly 20 having a housing 21 which is generally rectangular in configuration having opposing and spaced sidewalls 22 and opposing and spaced endwalls 23. The housing further includes an upper portion or cover 24 which may be removable mounted to the side and endwalls 22 and 23 by conventional fasteners. In some instances, the cover may be integrally formed with the side and endwalls. The lower portion of the housing includes an enlarged opening 25 which defines a discharge outlet for air passing through the blower and filter assembly.

The housing 21 defines an interior plenum chamber 26 in which is mounted a blower 28 which is preferably a centrifugal fan or blower having a plurality of vertically oriented blades which are mounted between opposing plates. The blades are oriented generally radially outwardly from the central rotational axis A—A of the blower.

The blower is mounted within the plenum chamber 26 below an upper inlet opening 32 formed in the cover through which air is introduced into the plenum chamber. A pre-filter housing 34 is mounted over the opening 32. The pre-filter housing includes an opening 35. A conventional pre-filter 36 such as a washable polyurethane foam is mounted within the opening 35. In this manner, all air is pre-filtered before entering the plenum chamber 26.

A plurality of motor supporting brackets 38 are mounted to the lid 24 using motor isolators 40. In the embodiment shown, the motor isolators, as shown in FIG. 7, include oppositely oriented threaded shafts 42 on which are mounted a pair of opposing plates 43 and 44. The plates are secured on opposite sides of a freely movable soft-rubber or rubber-like cylindrical damper 45 which serves to damp vibration forces created by a motor 46. The threaded shafts 42 are secured to the brackets 38 and the lid 24. When the brackets 38 are seated on the isolators 40, the motor and brackets will be suspended from the dampers 45. Thus, the motor and brackets float on the dampers 45.

The motor 46 includes a central drive shaft 48 which is connected to a central hub portion 47 of the blower 28 so that the blower rotates with the motor drive shaft. Power to the motor is provided through an electrical line 49 from a junction box 50 which is mounted to the cover of the housing.

Mounted interiorly of the plenum chamber is a first or intermediate baffle 52 which extends between the sidewalls 22 of the housing and which may be secured to the sidewalls. With reference to FIGS. 3 and 4, the baffle includes opposite ends 53 which are spaced from the endwalls 23 of the housing so as to form air passageways 54 around the ends of the baffle. In this manner, air being discharged from the blower 28 is directed in opposite directions toward the endwalls 23 from which the air passes through the air passageways 54 below the baffle and toward the outlet 25 in the housing.

Mounted within the plenum chamber below the first baffle is an enlarged filter 60 through which air passing through the housing must pass before being discharged from the opening 25. The filter 60 is preferably a high efficiency particulate filter, commonly referred to as a HEPA filter, which is capable of removing particles within the air of 0.3 microns or larger. It is preferred that the filter be mounted so that it is sealed with respect to the inner walls of the housing so that all air passing downstream of the first baffle must pass through the filter before being discharged. Appropriate gaskets may be provided as necessary.

In the embodiment shown in FIG. 2, air passing around the ends of the first baffle is further directed and diffused by a pair of opposing somewhat concave secondary baffles 62 which are mounted to or spaced from the endwalls 23 and which extend across the full width of the housing between the sidewalls 22. As the secondary baffles are somewhat arcuate or U-shaped, they will serve to redirect the airflow inwardly so as to better distribute the airflow through the downstream filter 60.

To reduce vibration and the level of noise created by air moving through the housing, a layer of insulation material 61 may be adhesively or otherwise secured to the surface of each of the secondary baffles. The air is further diffused by providing air diffusion screens 64 which extend between the lower portion of the intermediate baffle 52 and the secondary baffles 62. The diffusion screens are preferably made of a metallic or plastic material having a plurality of closely spaced openings therein. An expanded metal mesh may also be utilized. The screens extend the full width of the housing between the sidewalls so that all air passing around the ends 53 of the first baffle must pass through the diffusion screens. To further reduce vibration and operational noise level, a sound insulation material 65 is provided along the inner surface of the cover.

With continued reference to FIGS. 3 and 4, the baffle 52 includes a central recessed area 66 defined by a pair of opposing inclined sidewalls 67 and endwalls 68. The recessed area includes a bottom wall 69 which is generally square or rectangular. Each tapered sidewall 67 terminates in an upper generally horizontal ledge 70 which extends between the endwalls 68 and an upper flange 71 which extends generally parallel to the sidewalls of the housing and which may be secured to the housing by conventional fasteners or by welding.

To reduce noise and vibration, the end portions 53, tapering endwalls 68 and bottom wall 69 of the first baffle are covered with a sound insulating material 72. The opposite sidewalls 67 are generally not covered with sound insulation material. The baffle is preferably formed of an aluminum or other metallic material although plastic materials may be utilized in some instances.

With specific reference to FIG. 2, the blower 28 is of a size to be received within the recessed portion 66 of the first baffle so that a portion of the blades extend above the baffle toward the inlet opening into the plenum chamber. The upper portion of the blower is preferably substantially aligned with the lower surface of the insulation material 65.

It has been noted that a blower and filter assembly having the general configuration thus far described operate with great efficiency and at fairly low noise and vibration levels. However, because of the rectangular configuration of the housing, the airflow pattern developed by the rotational blower or fan will cause a build-up of turbulence and pressure in the interior corners of the housing. By way of example, in FIG. 2, the rotation "R" of the fan is counter clockwise as indicated by the arrow. Therefore, and with specific reference to FIGS. 1 and 4, as air is being discharged by the blower as it rotates, a portion of the air being discharged from the blower adjacent the ends of the baffle will flow over the ends of the baffle and toward the filter, as is shown by Arrow A1. However, a significant portion of the air being discharged along the end portions is directed generally toward a first pair of diagonally oriented corners 80 and 81 of the housing, as shown by Arrow A2. Air which is forced outwardly toward the sidewalls of the housing will develop a flow along the sidewalls toward the interior and opposite diagonally oriented corners 82 and 83 of the housing, as shown by Arrow A3, even though a portion of the air will develop a radial flow toward the corners and the air passageways 54 at the ends 53 of the first baffle, as shown by Arrow A4.

Because of these operational characteristics, a greater pressure is developed in the fist diagonal corners 80 and 81 than in the corners 82 and 83. In corners 82 and 83, the airflow A3 will re-direct some of the airflow A4 toward the adjacent endwall.

To re-direct the air which is flowing toward the first corners of the housing, a pair of angularly oriented imperforate deflectors 84 are mounted so as to extend from the sidewalls along the diagonally oriented corners 80' and 81' of the intermediate baffle. The deflectors 84 extend upwardly into engagement with the insulation 65 covering the lower surface of the cover of the housing. The deflectors have a first portion 85 which is preferably secured to the adjacent sidewall of the housing or to one of the elongated flanges 71 of the first baffle. As the air A2 travels toward the deflectors 84, the air will be directed by a second angled portion 86 inwardly toward the airflow passageways 54 and will thus be prevented from impacting turbulently against the corners 80 and 81 of the housing thereby significantly reducing pressure in the corners and thus reducing noise and vibration previously experienced in the operation of similar blower and filter assemblies. As shown, the second end portions of the deflectors are angled from the adjacent sidewall toward the adjacent endwall of the housing.

A second pair of air deflectors 88 extend along the opposite diagonal corners 82' and 83' of the first baffle and extend upwardly therefrom into engagement with the insulation 65. The deflectors 88 have a plurality of openings 87 therethrough which allow some air to pass through the deflectors while some of the air is deflected angularly away from the adjacent sidewall of the housing. In this manner, the deflectors 88 function as diffusion members so that most of the airflow will be re-directed away from the corners 82 and 83 of the housing while some of the air will pass through the deflectors 88 again reducing noise and vibrational levels.

It is preferred that these deflectors permit some of the air to pass therethrough so as to prevent the build-up of any vacuum in the corners 82 and 83 of the housing which could create adverse turbulence. Each deflector 88 has a first portion 89 which is secured to the sidewall of the housing or the adjacent flange 71 of the first baffle. A second portion 90 of each deflector extends angularly toward the adjacent endwall of the housing.

To further reduce the noise level of the blower and filter assembly, a plate 92 is placed over the insulation covering the bottom wall 69 of the recessed area 66. The plate is preferably not covered with any insulation material but has a relatively non-interrupted or smooth upper surface. In this respect, the plate is made of an aluminum or smooth plastic material. Although the plate is shown as being rectangular in configuration, other configurations may be utilized. An opening 93 is provided centrally of the plate in order to provide clearance for the blower hub 47. The plate is provided as a sound reflector. In many circumstances, due to the shape of the blower, when the blower rotates, it acts like an audio speaker and sound is directed downwardly along Axis A—A. The plate 92 reflects the sound thereby muting the sound generated by the blower.

It should be noted, in some instances, the blower and filter assembly may be utilized without the secondary baffles or diffuser screens previously discussed thereby allowing the endwalls of the housing to re-direct air toward the downstream filter. In these embodiments, however, the deflectors previously discussed are utilized to prevent turbulence and resulting vibration resulting from air flow being directed to the corners of the housing.

In addition to the foregoing, in some instances, manufacturers have utilized variations of the compact blower and filter assemblies disclosed in U.S. Pat. No. 4,560,395, wherein air is directed toward only a single endwall of the filter unit. In these instances, the first baffle includes only one end which is spaced from an adjacent endwall to define an air passageway such as described above at 54. In these instances only a single deflector plate 84 and a single deflector plate 88 would be utilized adjacent the opposite corners of the housing and between the end of the first baffle which is spaced from the endwall of the housing. In a like manner, both the deflectors 84 and 88 would extend toward the endwall so as to prevent the buildup of pressure in the corners adjacent the deflector 84 and to allow a diffusion of air adjacent the corner of the housing adjacent deflector 88.

We claim:

1. In an air purification apparatus including a housing having opposite sidewalls and opposite endwalls which define a first pair of diagonally oriented corners and a second pair of diagonally oriented corners, an upper and a lower portion, the housing defining an interior plenum chamber with an inlet opening in the upper portion of the housing and a discharge opening in the lower portion of the housing, a blower means mounted within the plenum chamber, means for rotating the blower means, a filter mounted between the blower means and the discharge, a first baffle having opposite sides and opposite ends mounted between the blower means and the filter means, the ends of the first baffle being spaced from the endwalls of the housing, and the blower means being operable to direct airflow along the sidewalls toward the second pair of diagonally oriented corners of the housing, the improvement comprising, a pair of first deflector means extending inwardly of the plenum chamber from each of the sidewalls of the housing adjacent to but spaced from the first pair of diagonally oriented corners, said first deflector means having a portion angled toward an adjacent endwall of the housing, and a second pair of air deflector means extending inwardly of the plenum chamber from each of the sidewalls adjacent to but spaced from the second pair of diagonally oriented corners, said second deflector means having a portion angled toward an adjacent endwall of the housing, whereby as air is directed generally radially outwardly with respect to the blower means, the air will be directed by said first and second deflector means away from said first and second pairs of diagonally oriented corners.

2. The apparatus of claim 1 in which each of said second deflector means includes a plurality of openings therein whereby some air passes therethrough.

3. The apparatus of claim 2 in which said first and second deflector means extend substantially between said baffle and the upper portion of the housing.

4. The apparatus of claim 3 in which each of said first and second deflector means includes another portion which is mounted to extend generally parallel to the sidewalls of the housing.

5. The apparatus of claim 3 in which said portions of each of said first and second deflector means are spaced from the endwalls of the housing.

6. The apparatus of claim 5 in which the first baffle includes a recessed portion having a bottom wall and oppositely sloped endwalls and oppositely sloped sidewalls, insulation means covering said bottom wall and said sloped endwalls, and a plate mounted to the insulation in overlying relationship to said bottom wall.

7. The apparatus of claim 6 in which the means for rotating the blower means includes a motor, means for mounting said motor to said housing, said mounting means including at least one bracket mounted to the motor and isolator damping means mounted between said at least one bracket and said housing.

8. The apparatus of claim 7 in which the housing further includes second baffles mounted adjacent each of the endwalls thereof, each of said second baffles being generally concave in configuration, said second baffles being oriented so as to deflect air flow from the first baffle inwardly of the plenum chamber and toward the filter means.

9. The apparatus of claim 8 in which the filter means is a HEPA filter.

10. The apparatus of claim 1 in which the first baffle includes a recessed portion having a bottom wall and oppositely sloped endwalls and oppositely sloped sidewalls, insulation means covering said bottom wall and said sloped endwalls, and a sound reflecting plate mounted to the insulation in overlying relationship to said bottom wall.

11. The apparatus of claim 10 in which the means for rotating the blower means includes a motor, means for mounting said motor to the upper portion of the housing, said mounting means including brackets mounted to the motor and isolator damping means mounted between each of said brackets and said housing.

12. The apparatus of claim 11 in which said first and second deflector means extend between said first baffle to the upper portion of the housing.

13. The apparatus of claim 12 in which the housing further includes second baffles mounted adjacent each of the endwalls thereof, each of said second baffles being generally concave in configuration, said second baffles being oriented so as to deflect air flow from the first baffle inwardly of the plenum chamber and toward the filter means.

14. The apparatus of claim 12 in which each of said second deflector means includes a plurality of openings therein whereby some air passes therethrough.

15. The apparatus of claim 14 in which the filter means is a HEPA filter.

16. In an air purification apparatus including a housing having opposite sidewalls and opposite endwalls which define a first pair of diagonally oriented corners and a second pair of diagonally oriented corners, an upper and a lower portion, the housing defining an interior plenum chamber with an opening defining an inlet into the plenum chamber and an opening forming a discharge outlet from the plenum chamber, a blower means for directing air from the inlet to the outlet, means for rotating the blower means, a filter mounted within the plenum chamber, a first baffle having opposite sides and opposite ends mounted within the plenum chamber between the inlet and the filter, the ends of the baffle being spaced from the endwalls of the housing, and the blower means and first baffle directing airflow along the sidewalls toward the second pair of diagonally oriented corners, the improvement comprising, a pair of first deflector means extending inwardly of the plenum chamber from each of the sidewalls of the housing adjacent to but spaced from the first pair of diagonally oriented corners, said first deflector means having a first portion spaced from an adjacent endwall of the housing and a second portion angled toward said adjacent endwall of the housing, and second air deflector means extending inwardly of the plenum chamber from each of the sidewalls adjacent to but spaced from the second pair of diagonally oriented corners, said second deflector means having a first portion spaced from an adjacent endwall and a second portion angled toward said adjacent endwall, whereby as air is directed generally radially outwardly with respect to the first baffle, airflow will be directed by said first and second deflector means away from said first and second diagonally oriented corners.

17. The apparatus of claim 16 in which each of said second deflector means includes a plurality of openings therein whereby some air pass therethrough.

18. The apparatus of claim 16 in which said first and second deflector means extend from adjacent corner portions of said first baffle to the upper portion of the housing.

19. The apparatus of claim 16 in which the first baffle includes a recessed portion having a bottom wall and oppositely sloped endwalls and oppositely sloped sidewalls, insulation means covering said bottom wall and said sloped endwalls, and a plate mounted to the insulation in overlying relationship to said bottom wall.

20. The apparatus of claim 16 in which the means for rotating the blower means includes a motor, means for mounting said motor to said upper portion of the housing, said mounting means including brackets mounted to the motor and isolator damping means mounted between each of said brackets and said housing.

21. In an air purification apparatus including a housing having opposite sidewalls and an endwall which define first and second corners, an upper and a lower portion, the housing defining an interior plenum chamber with an opening defining an inlet into the plenum chamber and an opening forming a discharge outlet from the plenum chamber, a blower means for directing air from the inlet to the outlet, means for rotating the blower means, a filter mounted within the plenum chamber, a first baffle having opposite sides and opposite ends mounted within the plenum chamber between the inlet and the filter, the ends of the baffle being spaced from the endwall of the housing, and the blower means and first baffle directing airflow along a first sidewall toward the second corner, the improvement comprising, a first deflector means extending inwardly of the plenum chamber from the first sidewall of the housing adjacent to but spaced from the first corner, said first deflector means having a first portion spaced from the endwall of the housing and a second portion angled toward the endwall of the housing, and second air deflector means extending inwardly of the plenum chamber from the other sidewall adjacent to but spaced from the second corner, said second deflector means having a first portion spaced from the endwall and a second portion angled toward the endwall, whereby as air is directed outwardly with respect to the first baffle, airflow will be directed by said first and second deflector means away from said first and second corners.

22. The apparatus of claim 21 in which said first and second deflector means extend between said first baffle and the upper portion of the housing.

23. The apparatus of claim 22 in which said second deflector means includes a plurality of openings therein whereby some air passes therethrough.

* * * * *